June 3, 1941.  H. EHRENBERG  2,244,190
PROFILE COPYING MACHINE
Filed Feb. 3, 1938
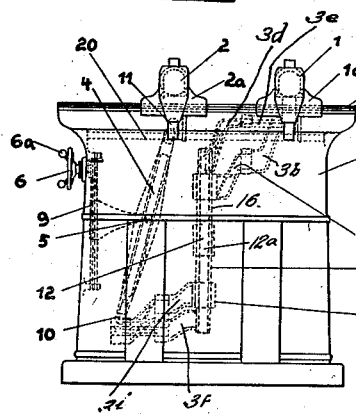
Fig. 1
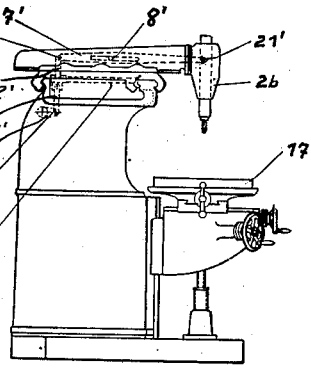
Fig. 3
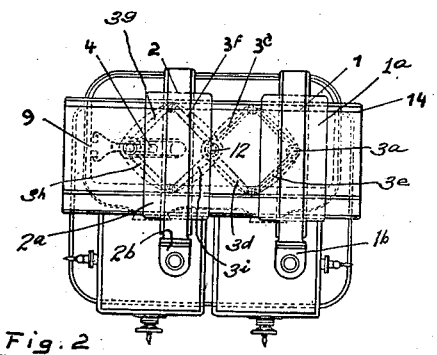
Fig. 2
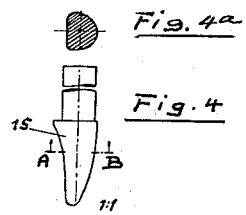
Fig. 4a
Fig. 4
Fig. 4b
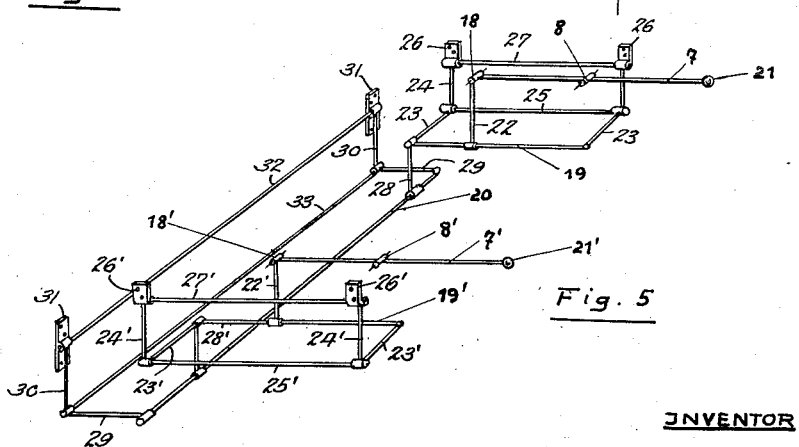
Fig. 5
INVENTOR:
Hermann Ehrenberg Patented June 3, 1941

2,244,190

UNITED STATES PATENT OFFICE 2,244,190

PROFILE COPYING MACHINE

Hermann Ehrenberg, Frankfort-on-the-Main, Germany

Application February 3, 1938, Serial No. 188,488
In Germany February 22, 1937

6 Claims. (Cl. 90—13.1)

Nearly all the hitherto known copy milling machines have the drawback that the cutter spindle and the copying or guide pin are suspended in, or secured to, a horizontal or vertical pantograph, so that the pantograph which in any case is sensitive, is the carrier or support of the tools. Moreover, these machines work only either in the ratio of 1:1 or 1:5 to 1:10. The range of working of these machines is very much restricted by the arrangement of the pantograph, and does not allow of the copying of large work or objects. As moreover the force used and required for the natural detachment of shavings or cuttings in the hitherto known machines is taken up and transmitted by the pantograph, naturally only detachment of very small cuttings is possible. For the purpose of enabling larger cuttings to be detached, separate guides are mounted in the known machines, to which the guide pin is hinged. These guides partly conceal the model and restrict the space over the range of working. These devices are used moreover only for the rough turning and systematic feeling of three-dimensional models. It is therefore impossible to obtain for instance a two-dimensional circular movement with the well known auxiliary means, as the spindle pressure of the two screw spindles arranged on a compound slide rest, or the pressure of two hydraulic pistons which also engage independently of each other after the manner of a compound slide rest, would produce jamming between the guide pin and the template.

Other machines are provided for the transmission of power also with a lever gearing after the manner of lazy tongs, owing to which the machining of deep forms or of annular tools which are to be machined inside in the upright position is impossible. Moreover, the tools in the well known copy milling machines do not work at right angles to the table, but describe a radius in the third dimension. This has the drawback that deep dies with vertical flanks can be machined on such machines only in an unfavourable manner. The tools receive a rotation in the two horizontal dimensions, owing to the main axis of the pantograph, and this rotation is greater or smaller according to the distance of the tools from the main axis and other pantograph branch axes, as well as according to the extent of the working surface to be covered. The shape of a die can be thus determined only by means of a separate three-dimensional model, but the making of these models is in part a very complicated matter. With the rotation of the guide pin and cutter spindle determined by the construction of the known copy milling machines with mechanical transmission elements, these tools can work only in the vertical position, as an oblique position of the tool would produce a distorted reproduction owing to the angular position relatively to the parallel plane being altered by the movements of the tool holder (pantograph branches). This has the drawback that grooves and other profiles cannot be milled at all in the vertical lateral walls of deep dies, and if the work is fixed obliquely can be produced only to a very small depth.

Another drawback of the well known machines is that at least at three sides the pantograph projects over the cutter spindle and therefore the range of working of the machine is obstructed or closed in the upward direction. The machining of deep forms is thus rendered impossible. All these machines have the further drawback that in order to get a different ratio—in so far as this is at all possible—several sliders on the pantograph have to be moved, owing to which the accuracy of the work is rendered uncertain. It is a further drawback of the known machines that the range of working of the cutter spindle varies relatively to the guide pin at each different setting of the pantograph, owing to which it is impossible for instance to draw several circles of unequal diameter about a common centre from a template by shifting the pantograph, without at the same time having to set the machine afresh again before beginning the next circle. Finally the drive of the well known machines is also an unfavourable one, as the revolving V- or round belts limit the range of working and are subject to a very great wear.

The object of the invention is to eliminate all these drawbacks and inconveniences, and to provide a copy milling machine with which it is possible to improve and cheapen the manufacture, more particularly of tools for the treatment of new materials, and in some cases to enable them to be manufactured for the first time. The invention relates to a three-dimensionally working engraving and copy milling machine (hereafter termed a profile copying machine).

A construction according to the invention is illustrated by way of example in the accompanying drawing in which:

Fig. 1 is a front elevation of the machine,

Fig. 2, a plan view of the same,

Fig. 3, a side elevation of the machine,

Fig. 4, shows several views of a profiled guide pan, and

Fig. 4a is a cross-sectional view taken on the section line A—B of Fig. 4.

Fig. 4b is a top plan view of Fig. 4.

Fig. 5 shows diagrammatically, in perspective, the method of working of the machine in the third dimension.

The drawing shows the guide pin holder 1 which moves with the slide rest 1a as a compound slide rest, on the ways or prisms of the slide guide 14. By means of a two-axis lever system 3 which is mounted on the common shaft 16 and at the other end of which engages, by means of a ball joint 10, the control lever 4, is driven the cutter head 2 which is moved in the same direction by means of a compound slide 2a on the slide guide 14. The control lever 4 is a double-armed lever, the upper free end of which engages by means of the joint 11, with the cutter head 2. The lever itself is mounted on an adjustable centre of rotation. Owing to the compound slide rest arrangement of the guide pin holder 1 and cutter spindle holder 2, complete parallel guiding is obtained. The result is a uniform movement of the tools without an additional turning of their own, with controllable guiding in space and plane. It thus becomes possible to use profiled guide pins (see Fig. 4), for instance for producing dies with side walls which are irregular in the direction of the depth, i. e., in the vertical, from a two-dimensional sheet metal template fixed to parallel pieces, the height of which corresponds to the depth of the die to be milled, as the guide pin does not turn, as in the well known machines, about the main axis and the axes of the other joints of a pantograph, and therefore the eccentric profile given to the guide pin, feels the template exactly as determined beforehand. The template which may be made if desired as a flat template, determines by the sliding of the correspondingly shaped feeler pin on the inside and outside edges the deviations of the feeler pin from the direction of movement, and therefore the milling of the work by the cutter spindle.

In order to obtain another copying ratio between the ratios 10:1 to 1:10, the centre of rotation 5 of the lever 4 is simply correspondingly moved vertically by means of the hand wheel 6, 6a. This ensures that the setting ratio is always absolutely exact, as only one single setting point and one single lever determine the ratio.

The transmission of the third dimension is effected by means of the lever 7 which is built as a two-armed lever and moves about the adjustable centre of rotation 8. The vertical movement produced by the copying model at the point 21 is transmitted from the point 18 to a shaft 19 arranged like a lever, which then transmits the movement to a lever-like acting main shaft 20 (see Fig. 5) which in its turn transmits the movement to the cutter spindle head 2 by a similar mechanism as from 21—20, the movement being transmitted by the mechanism in its reverse order from main shaft 20 to shaft 19' thence to point 18' and so to 21', so that the cutter executes over the table 17 the same uniform movement as the feeler pin. Fig. 5 shows diagrammatically the manner in which the motion in the vertical direction is transmitted from the feeler pin to the cutter spindle. The pin 21 pivotally connects lever 7 to the feeler pin, which is vertically slidable in the pin holder 1. As the feeler pin passes over a model or template and moves up and down the pivot 21 moves up and down and the lever 7, which is pivoted at 8, causes the joint 18 to move up and down. The ratio of the movement of joint 18 to the movement of pivot 21 depends on the ratio of the lengths of the two arms of the lever 7, and the pivot 8 is therefore made axially adjustable along the lever 7. (See Fig. 3.) The movement of the joint 18 is imparted to shaft 19 by the link 22 which is pivotally attached at either extremity. Shaft 19 is held by two links 23 pivotally connected to two links 24 having their ends connected by a member 25 for strength. The upper ends of the links 24 are pivotally connected to the frame of the machine or to some rigid support by hinges 26 with a common pintle 27. A link 28 transmits the vertical movement of the shaft 19 to main shaft 20. The shaft 20 is held by two links 29 pivotally connected to the links 30 which are pivotally connected to a rigid support by hinges 31 having a pintle 32, and a member 33 is provided to give greater rigidity. The members 28 and 28' slide during the movement of the key pin holder and the tool holder along the guide 14 on the rod 20. In addition, the members 22 and 22' slide during the movement of the holders 1 and 2 longitudinally on the rods 19, 19'. The link 28' transmits the vertical movement of shaft 20 to shaft 19' which is mounted in a manner similar to that of shaft 19 on links 23' and 24' and hinges 26' on a rigid support and having a common pintle 27', a strengthening member 25' being provided also. This causes the joint 18' to move up and down, and the pin 21' therefore also moves up and down, the ratio of the movement of joint 18' and pin 21' depending on the ratio of the lengths of the two arms of the lever 7' fulcrumed at 8'. The pin 21' pivotally connects lever 7' to the vertically slidable cutter spindle. If Fig. 3 and Fig. 5 are compared it can be seen how this mechanism is to be constructed and arranged in the machine. The shaft 20 which can move up and down on the links 29 transmits its motion by link 28' to shaft 19' and thence by link 22' to joint 18', thus rocking the lever 7' about its adjustable fulcrum 8'. This causes the pin 21' to move up and down and actuates the cutter spindle which is vertically slidable in its head 2. By shifting the centre of rotation 8, the ratio of the third dimension between 10:1 and 1:10 is determined completely independently of the two horizontal dimensions. It is thus possible to make deep shapes from flat models, and conversely. In order to enable the lateral walls of very deep dies and other shaped objects to be machined, the cutter spindle and the guide pin are mounted so that they can be turned to an angle of 45°. A weight determines the pressure of the feeler pin on the copy model. The control of the machine is not necessarily, as in the well known machines, by the attendant guiding the feeler pin direct with his hands, but in the case of rough turning as well as in the finishing milling, it can be accomplished by means of transmission elements which may be constituted by a toothed rack and pinion easily controllable in two directions without jamming between the feeler pin and model, or by two hydraulic pistons controlled by a lever, which influence each other during the feed and at the same time work without jamming.

As driving elements situated outside the cutter casing very often unfavorably affect the range of working, for example in the case of deep or annular work where the V- or cord belts mostly used, engage with, and slide on, the edges of the work, more particularly as these driving belts in the case of heavy cutting vibrate very strongly, the driving of the cutter spindle is effected by means of ball-joint spindle or by means of angle gearing which is mounted in the cutter spindle holder 2, 2a.

The guide pin holder 1 and the tool holder 2 are each disposed so as to move transversely on the slides 1a and 2a and the slides 1a and 2a move on a common guide 14. Engaged with the holder 1 is a guide system 3 which is constructed like a kind of shears. The guide system is movable about a common axis 12 which is journalled as 12a. At 3a there is engaged with the holder 1, one part of the shears which forms a jointed rectangle 3b, 3c, 3d and 3e. The other part of the shears, the jointed rectangle 3f, 3g, 3h, 3i, is connected on the other hand with the shaft or axis 12 and is connected by the ball joint 10 with the lever 4, the upper end of which engages through the link or member 11 with the tool holder 2. Lever 4 is movable to all sides about the pivot point 5, and point 5 is vertically adjustable along the guide path 9 by means of the handwheel 6, 6a.

Merely for the purpose of interposing lever 4 the guide system 3 is subdivided in height, so that the members 3b, 3c, 3d and 3e are above the bearing 12a and the members 3f, 3g, 3h and 3i are below the bearing 12a. Thereby, the members 3c and 3i, on the one hand, and the members 3d and 3f, on the other, form a rigid lever. For this purpose the members 3d and 3f are rigidly connected with the shaft 12, while members 3c and 3i are connected with a sleeve 16 which encompasses shaft 12 rotatably.

Operation is as follows:

In the movement of the pin in the direction of the longitudinal axis of holder slide 1 the point 3a is also carried along in this direction. By means of the guide system the movement is transmitted to the ball joint 10 in reverse direction. Through this ball joint the movement is further transmitted over the double-armed lever 4 which, in turn, is pivotally connected with tool holder 2 at 11, so that the holder 2, and therewith the tool, describes a movement in the same direction as the pin of holder slide 1. The same is true of the transverse movement. If, for example, the pin of holder slide 1 is moved to the right the joint 10 moves to the left. By means of the double-armed lever 4, however, there is a corresponding movement of holder 2 again to the right. On moving the pin of holder slide 1 in a circle there is a corresponding circular movement in the same direction of the tool of holder 2. Any desired movement of the pin, for example, diagonally, circularly or the like is thus possible with the arrangement of the invention, and this movement is described in the same manner and the same direction by the tool, that is, a circular movement of the pin corresponds to the same movement of the tool in the same direction. If the pivot point 5 is in the center between the joints 10 and 11 of the lever 4 the movements are transmitted in the ratio of 1:1. If the pivot point 5 is elevated there is a reduced transmission, that is, on a smaller scale. On lowering it from the center there is a magnified transmission, that is, an enlargement. It is essential that also in the reduction and enlargement the movements of the pin and tool may take place in all directions, and that the tool move according to the movement of the pin and in the same direction.

Owing to the slide rest-like mounting of the guide pin and cutter spindle, the machine 13 is capable of very heavy milling work. In order, however, to enable it to be used also for the heaviest possible die-milling work and the like, the cutter head 2, 2a and the guide pin holder 1, 1a can be locked, without losing the mobility of the tools in the vertical direction. When the table 17 is coupled to the template table, and both act as a compound slide rest, even very heavy dies and forms can be positively copied 1:1, the depth or modelling in the ground surface being determined and fixed more particularly by the possibility of adjustment in the vertical dimension.

The members 21 and 21' are ball joints and for this reason it is possible to turn the heads 1b and 2b of the holders 1, 2 in a vertical plane without the rotation being transmitted to the levers 7 or 7'. Within the heads 1b and 2b the pin or tool is slidable vertically and this movement is transmitted over lever 7.

In order to make it possible to mill in the vertical lateral walls of deep dies, grooves and other shapes, the cutter spindle and the feeler pin can be placed obliquely up to an angle of 45 degrees out of the vertical in either direction, this being rendered possible by mounting the feeler pin and cutter spindle heads in known manner so that they are rotatable on the cross-slides in planes perpendicular to the axes of the slides on which they are mounted.

In order finally to be able to work with the largest possible tools, the feed is effected in a positive manner hydraulically or by means of gear wheels and toothed racks in every direction, the toothed wheels being operated by hand as well as mechanically.

I claim:

1. A profile copying machine comprising a frame having a main guide and work and copying tables, transverse slides on said main guide for a cutting tool and a guide pin, transmission means between said transverse slides comprising a shaft, a lazy tongs linkage mounted on said shaft having one end thereof pivotally connected to one of said transverse slides, a double-armed lever having one end thereof connected to the other end of said linkage, the other end of said lever being connected to the other transverse slide and said shaft and lever being disposed in substantially the same plane.

2. A profile copying machine comprising a frame having a main guide and work and copying tables, transverse slides on said main guide for a cutting tool and a guide pin, transmission means between said transverse slides comprising a shaft, a lazy tongs linkage mounted on said shaft having one end thereof pivotally connected to one of said transverse slides, a double-armed lever pivotally mounted on said frame, means for shifting the pivot point of said double-armed lever, one end of said double-armed lever being connected to the other end of said linkage, the other end of said lever being connected to the other transverse slide and said shaft and lever being disposed in substantially the same plane.

3. A profile copying machine comprising a frame having a main guide and work and copying tables, transverse slides on said main guide for a cutting tool and a guide pin, transmission means between said transverse slides comprising a shaft, a lazy tongs linkage mounted on said shaft having one end thereof pivotally connected to one of said transverse slides, a double-armed lever having one end thereof connected to the other end of said linkage, the other end of said lever being connected to the other transverse slide and said shaft and lever being disposed in substantially the same plane, means for adjusting the vertical positions of said tool and guide pin with relation to said transverse slides and means interconnecting said tool and guide pin so that vertical adjustments of one are transmitted to the other.

4. A profile copying machine comprising a frame having a main guide and work and copying tables, transverse slides on said main guide for a cutting tool and a guide pin, transmission means between said transverse slides comprising a shaft, a lazy tongs linkage mounted on said shaft having one end thereof pivotally connected to one of said transverse slides, a double-armed lever having one end thereof connected to the other end of said linkage, the other end of said lever being connected to the other transverse slide and said shaft and lever being disposed in substantially the same plane, means for adjusting the vertical positions of said tool and guide pin with relation to said transverse slides and means interconnecting said tool and guide pin so that vertical adjustments of one are transmitted to the other, said last named means comprising a series of pivotally mounted interconnected links and levers.

5. A profile copying machine comprising a frame having a main guide and work and copying tables, transverse slides on said main guide for a cutting tool and a guide pin, transmission means between said transverse slides comprising a shaft, a lazy tongs linkage mounted on said shaft having one end thereof pivotally connected to one of said transverse slides, a double-armed lever having one end thereof connected to the other end of said linkage, the other end of said lever being connected to the other transverse slide and said shaft and lever being disposed in substantially the same plane, means for adjusting the vertical positions of said tool and guide pin with relation to said transverse slides and means interconnecting said tool and guide pin so that vertical adjustments of one are transmitted to the other, said last named means comprising a series of pivotally mounted interconnected links and levers, and means for varying the pivot points of certain of said levers.

6. A profile copying machine comprising a frame having a main guide and work and copying tables, transverse slides on said main guide, rotatable heads pivotally mounted so as to pivot in a vertical plane mounted on said transverse guides for a cutting tool and a guide pin, transmission means between said transverse slides comprising a lazy tongs linkage, one end of said lazy tongs linkage being pivotally connected to one of said transverse slides, a double-armed lever having one end thereof connected to the other end of said linkage, and the other end of said lever being connected to the other transverse slide.

HERMANN EHRENBERG.